(12) United States Patent
Fukuta

(10) Patent No.: US 9,991,997 B2
(45) Date of Patent: Jun. 5, 2018

(54) MOBILE COMMUNICATION SYSTEM, SPECIFIC BASE STATION, AND USER TERMINAL

(71) Applicant: KYOCERA CORPORATION, Kyoto (JP)

(72) Inventor: Noriyoshi Fukuta, Inagi (JP)

(73) Assignee: KYOCERA Corporation, Kyoto (JP)

( * ) Notice: Subject to any disclaimer, the term of this patent is extended or adjusted under 35 U.S.C. 154(b) by 0 days. days.

(21) Appl. No.: 15/118,619

(22) PCT Filed: Feb. 16, 2015

(86) PCT No.: PCT/JP2015/054071
§ 371 (c)(1),
(2) Date: Aug. 12, 2016

(87) PCT Pub. No.: WO2015/125717
PCT Pub. Date: Aug. 27, 2015

(65) Prior Publication Data
US 2017/0063502 A1    Mar. 2, 2017

(30) Foreign Application Priority Data
Feb. 21, 2014  (JP) .................................. 2014-032298

(51) Int. Cl.
*H04L 5/00*    (2006.01)
*H04W 16/14*    (2009.01)
(Continued)

(52) U.S. Cl.
CPC .......... *H04L 5/0032* (2013.01); *H04W 16/14* (2013.01); *H04W 36/0027* (2013.01); *H04W 36/0072* (2013.01); *H04W 92/20* (2013.01)

(58) Field of Classification Search
CPC ................ H04L 5/0032; H04W 16/14; H04W 36/0072; H04W 36/0027
(Continued)

(56) References Cited

U.S. PATENT DOCUMENTS 8,488,514 B2 *  7/2013  Cai .......................... H04W 36/30
                                                        370/315
2010/0169412 A1  7/2010  Gupta
(Continued)

FOREIGN PATENT DOCUMENTS

JP    H06-113356 A    4/1994
JP    2011-501479 A    1/2011
(Continued)

OTHER PUBLICATIONS

International Search Report issued in PCT/JP2015/054071; dated Apr. 14, 2015.
(Continued)

*Primary Examiner* — Cong Tran
(74) *Attorney, Agent, or Firm* — Studebaker & Brackett PC

(57) ABSTRACT

A LTE system comprises a eNB 200-2 that is a eNB shared by a plurality of network operators, and that performs LTE communication with a UE in a specific frequency band of which primary use is not allowed by the plurality of network operators. The specific eNB 200-2 performs backhaul communication with a eNB 200-1 provided in each mobile LTE network 1 of the plurality of network operators, via an inter-eNB interface 600.

6 Claims, 5 Drawing Sheets

(51) Int. Cl.
*H04W 36/00* (2009.01)
*H04W 92/20* (2009.01)

(58) Field of Classification Search
USPC ...... 455/435.2, 436–439, 423, 424; 370/328, 370/330, 331, 332
See application file for complete search history.

(56) References Cited

U.S. PATENT DOCUMENTS

| | | | |
|---|---|---|---|
| 2010/0263021 A1 | 10/2010 | Arnott et al. | |
| 2011/0081903 A1* | 4/2011 | Cai | H04W 36/0055 455/424 |
| 2014/0016537 A1* | 1/2014 | Khobare | H04W 36/30 370/315 |
| 2014/0094179 A1 | 4/2014 | Shimizu | |
| 2014/0153472 A1* | 6/2014 | Phan | H04L 5/0032 370/312 |
| 2014/0187236 A1* | 7/2014 | Chiang | H04W 24/04 455/423 |
| 2014/0301278 A1* | 10/2014 | Ghosh | H04W 28/06 370/328 |
| 2015/0312775 A1* | 10/2015 | Yi | H04W 16/00 370/254 |
| 2015/0327131 A1* | 11/2015 | Teyeb | H04W 8/24 370/331 |

FOREIGN PATENT DOCUMENTS

| | | |
|---|---|---|
| JP | 2012-034007 A | 2/2012 |
| JP | 2012-514434 A | 6/2012 |
| WO | 2012/160977 A1 | 11/2012 |
| WO | 2012/172689 A1 | 12/2012 |

OTHER PUBLICATIONS

Written Opinion issued in PCT/JP2015/054071; dated Apr. 14, 2015.
3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2; 3GPP TS 36.300; V12.0.0; Dec. 2013; pp. 1-208; Release 12; 3GPP Organizational Partners.

* cited by examiner

US 9,991,997 B2

MOBILE COMMUNICATION SYSTEM, SPECIFIC BASE STATION, AND USER TERMINAL

TECHNICAL FIELD

The present invention relates to a specific base station, a user terminal, and a mobile communication system by which a specific frequency band is used in mobile communication.

BACKGROUND ART

In 3GPP (3rd Generation Partnership Project), which is a project aiming to standardize a mobile communication system, specifications are being designed to enhance LTE (Long Term Evolution) in order to comply with the rapidly increasing traffic demands (for example, see Non Patent Literature 1).

On the other hand, attention is being paid to a specific frequency band that is shared by a plurality of mobile network operators or a plurality of communication systems. Such a specific frequency band includes, for example, an "unlicensed band" and a "licensed shared band".

Here, an unlicensed band is a frequency band that can be used without a license. A licensed shared band is a frequency band that is allocated for users having one purpose (called "primary users of a frequency"); however, depending on geographical conditions or technical conditions, a licensed shared band is a frequency band that can also be used by users having some other purposes (called "secondary users of a frequency").

Here, as a means for complying with the rapidly increasing traffic demands in a mobile communication system, the use of the above-described specific frequency band in mobile communication is considered.

CITATION LIST

Non Patent Literature

[NPL 1] 3GPP Technical Specification "TS 36. 300 V12. 0. 0" January 2014

SUMMARY

A mobile communication system according to a first aspect comprises a specific base station that is a base station shared by a plurality of mobile network operators, and that performs mobile communication with a user terminal in a specific frequency band shared by the plurality of mobile network operators or a plurality of communication systems. The specific base station is configured to perform backhaul communication with a general base station provided in each mobile communication network of the plurality of mobile network operators, via an inter-base station interface.

A specific base station according to a second aspect is a base station shared by a plurality of mobile network operators, and performs mobile communication with a user terminal in a specific frequency band shared by the plurality of mobile network operators or a plurality of communication systems. The specific base station comprises a controller configured to perform backhaul communication with a general base station provided in each mobile communication network of the plurality of mobile network operators, via an inter-base station interface.

A user terminal according to a third aspect is used in a mobile communication system including a specific base station that is a base station shared by a plurality of mobile network operators, and that performs mobile communication in a specific frequency band shared by the plurality of mobile network operators or a plurality of communication systems, and a general base station that is a base station provided in any one mobile communication network of the plurality of mobile network operators, and that performs communication with the specific base station via an inter-base station interface. The user terminal comprises a controller configured to perform communication of a dual connectivity in which communication with the general base station and communication with the specific base station are performed simultaneously. In the dual connectivity, the general base station is set as a master base station that establishes an RRC connection with the user terminal, and the specific base station is set as a secondary base station that provides additional radio resources to the user terminal.

DESCRIPTION OF EMBODIMENTS

Figure 1:
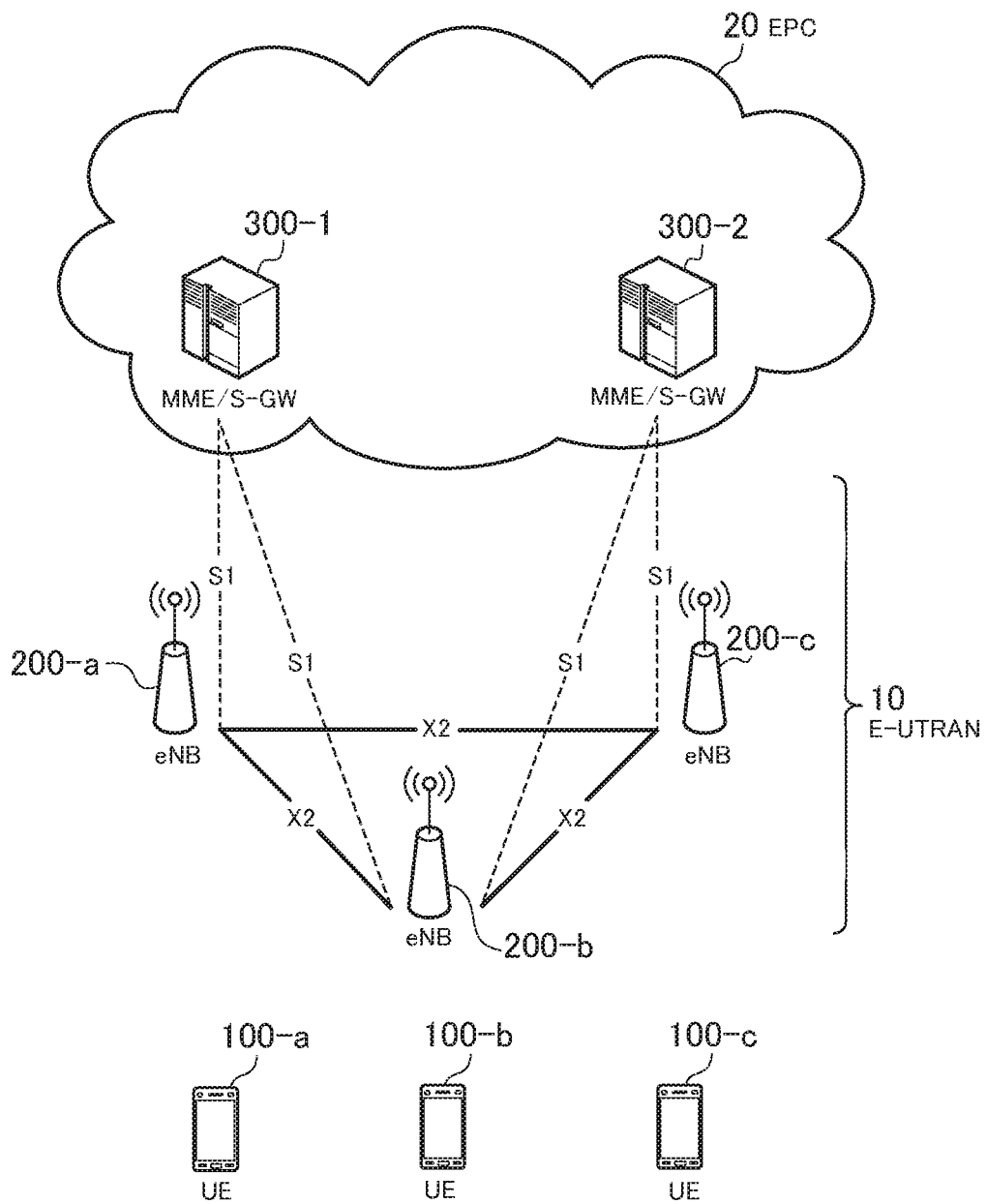
FIG. 1 is a configuration diagram of an LTE system according to an embodiment.

However, since the above-described specific frequency band does not allow the primary use of a frequency by a mobile network operator, and is a frequency that cannot be occupied by one mobile network operator, it is difficult to use the specific frequency band in mobile communication, which poses a problem.

Therefore, an object of the present invention is to provide a specific base station, a user terminal, and a mobile communication system by which it is possible to use a specific frequency band in mobile communication.

Overview of Embodiments

A mobile communication system according to the embodiments comprises a specific base station that is a base station shared by a plurality of mobile network operators, and that performs mobile communication with a user terminal in a specific frequency band shared by the plurality of mobile network operators or a plurality of communication systems. The specific base station is configured to perform backhaul communication with a general base station provided in each mobile communication network of the plurality of mobile network operators, via an inter-base station interface.

In the embodiments, the mobile communication system comprises an interface controller provided external to the mobile communication network. The interface controller establishes a communication path between the interface controller and the mobile communication network, which is used as the inter-base station interface.

In the embodiments, the mobile communication network has a gateway that functions as a connection point between the specific base station and the mobile communication network.

In the embodiments, when the specific base station cannot use the specific frequency band in the mobile communication, the specific base station transitions to a dormant mode in which at least the mobile communication is suspended, and also suspends the backhaul communication in the dormant mode.

In the embodiments, the specific base station, or an interface controller provided external to the mobile communication network transmits, to the general base station, a start notification indicating start of the dormant mode, or a cancellation notification indicating cancellation of the dormant mode, via the inter-base station interface.

In the embodiments, the cancellation notification includes frequency information indicating a frequency band to be used in the mobile communication after the cancellation of the dormant mode.

In the embodiments, the general base station manages a neighboring cell list that includes cell information of the specific base station, and mode information regarding whether or not the specific base station is in the dormant mode. The general base station updates the mode information included in the neighboring cell list in response to reception of the start notification or the cancellation notification.

In the embodiments, the mobile communication system further comprises a predetermined user terminal that supports a dual connectivity in which communication with the general base station, and communication with the specific base station are performed simultaneously. The general base station is a master base station that establishes an RRC connection with the user terminal in the dual connectivity. The specific base station is a secondary base station that provides additional radio resources to the user terminal in the dual connectivity.

In the embodiments, the predetermined user terminal that is in an RRC idle state performs cell re-selection control for selecting a cell of the general base station as a serving cell rather than selecting a cell of the specific base station as the serving cell.

In the embodiments, the predetermined user terminal notifies capability information indicating that the predetermined user terminal supports the dual connectivity, to the general base station or the specific base station.

In the embodiments, a user terminal that supports the mobile communication using the specific frequency band notifies capability information concerning the specific frequency band to the general base station.

A specific base station according to the embodiments is a base station shared by a plurality of mobile network operators, and performs mobile communication with a user terminal in a specific frequency band shared by the plurality of mobile network operators or a plurality of communication systems. The specific base station comprises a controller configured to perform backhaul communication with a general base station provided in each mobile communication network of the plurality of mobile network operators, via an inter-base station interface.

A user terminal according to the embodiments is used in a mobile communication system including a specific base station that is a base station shared by a plurality of mobile network operators, and that performs mobile communication in a specific frequency band shared by the plurality of mobile network operators or a plurality of communication systems, and a general base station that is a base station provided in any one mobile communication network of the plurality of mobile network operators, and that performs communication with the specific base station via an inter-base station interface. The user terminal comprises a controller configured to perform communication of a dual connectivity in which communication with the general base station and communication with the specific base station are performed simultaneously. In the dual connectivity, the general base station is set as a master base station that establishes an RRC connection with the user terminal, and the specific base station is set as a secondary base station that provides additional radio resources to the user terminal.

Embodiment

An embodiment of applying the present invention to a LTE system which is a mobile communication system configured in compliance with the 3GPP standards, will be described below.

(LTE System)

FIG. 1 is a configuration diagram of an LTE system according to an embodiment.

As illustrated in FIG. 1, the LTE system includes a plurality of UEs (User Equipments) 100, E-UTRAN (Evolved-UMTS Terrestrial Radio Access Network) 10, and EPC (Evolved Packet Core) 20.

The UE 100 corresponds to a user terminal. The UE 100 is a mobile communication device and performs radio communication with a cell (a serving cell). Configuration of the UE 100 will be described later.

The E-UTRAN 10 corresponds to a radio access network. The E-UTRAN 10 includes a plurality of eNBs (evolved Node-Bs) 200. The eNB 200 corresponds to a base station. The eNBs200 are connected mutually via an X2 interface. Configuration of the eNB200 will be described later.

The eNB 200 manages one or a plurality of cells and performs radio communication with the UE 100 which establishes a connection with the cell of the eNB 200. The eNB 200 has a radio resource management (RRM) function, a routing function for user data, and a measurement control function for mobility control and scheduling, and the like. It is noted that the "cell" is used as a term indicating a minimum unit of a radio communication area, and is also used as a term indicating a function of performing radio communication with the UE 100.

The EPC 20 corresponds to a core network. The EPC 20 includes a plurality of MME (Mobility Management Entity)/S-GWs (Serving-Gateways) 300. The MME performs various mobility controls and the like for the UE 100. The S-GW performs control to transfer user. MME/S-GW 300 is connected to eNB 200 via an S1 interface.

A network of the LTE system (hereafter referred as "LTE network") is configured by the E-UTRAN 10 and the EPC 20. The LTE network corresponds to the mobile communication network.

Figure 2:
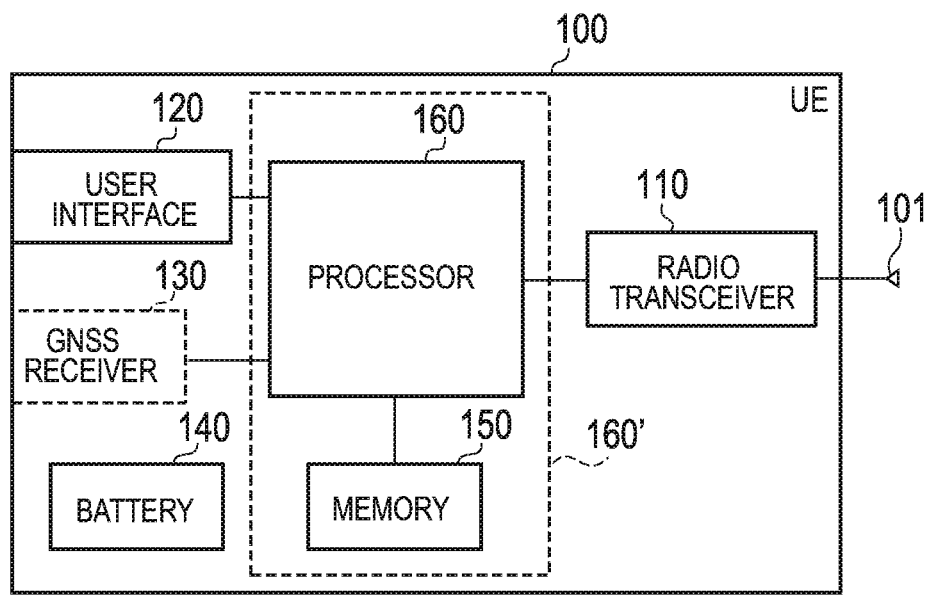
FIG. 2 is a block diagram of a UE according to the embodiment.

FIG. 2 is a block diagram of the UE 100. As illustrated in FIG. 2, the UE 100 includes plural antennas 101, a radio transceiver 110, a user interface 120, a GNSS (Global Navigation Satellite System) receiver 130, a battery 140, a memory 150, and a processor 160. The memory 150 and the processor 160 constitute a controller. The UE 100 may not have the GNSS receiver 130. Furthermore, the memory 150 may be integrally formed with the processor 160, and this set (that is, a chip set) may be called a processor 160'.

The antennas 101 and the radio transceiver 110 are used to transmit and receive a radio signal. The radio transceiver 110 converts a baseband signal (a transmission signal) output from the processor 160 into the radio signal and transmits the radio signal from the antennas 101. Furthermore, the radio transceiver 110 converts a radio signal received by the antennas 101 into a baseband signal (a received signal), and outputs the baseband signal to the processor 160.

The user interface 120 is an interface with a user carrying the UE 100, and includes, for example, a display, a microphone, a speaker, various buttons and the like. The user interface 120 accepts an operation from a user and outputs a signal indicating the content of the operation to the processor 160. The GNSS receiver 130 receives a GNSS signal in order to obtain location information indicating a geographical location of the UE 100, and outputs the received signal to the processor 160. The battery 140 accumulates power to be supplied to each block of the UE 100.

The memory 150 stores a program to be executed by the processor 160 and information to be used for a process by the processor 160. The processor 160 includes a baseband processor that performs modulation and demodulation, encoding and decoding and the like on the baseband signal, and CPU (Central Processing Unit) that performs various processes by executing the program stored in the memory 150. The processor 160 may further include a codec that performs encoding and decoding on sound and video signals. The processor 160 executes various processes and various communication protocols described later.

Figure 3:
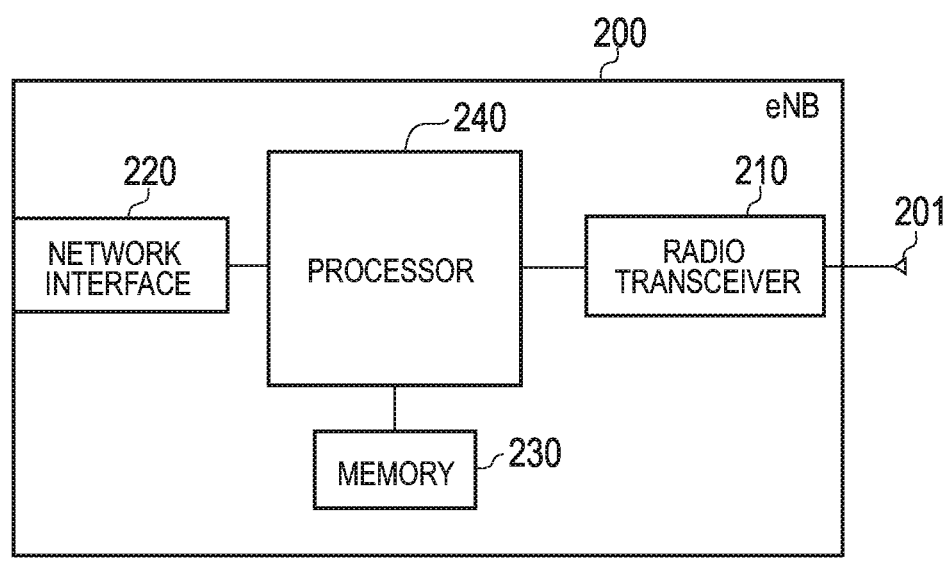
FIG. 3 is a block diagram of an eNB according to the embodiment.

FIG. 3 is a block diagram of the eNB 200. As illustrated in FIG. 3, the eNB 200 includes plural antennas 201, a radio transceiver 210, a network interface 220, a memory 230, and a processor 240. The memory 230 and the processor 240 constitute a controller. Further, the memory 230 may be integrally formed with the processor 240, and this set (that is, a chipset) may be called as a processor.

The antennas 201 and the radio transceiver 210 are used to transmit and receive a radio signal. The radio transceiver 210 converts a baseband signal (a transmission signal) output from the processor 240 into the radio signal and transmits the radio signal from the antennas 201. Furthermore, the radio transceiver 210 converts a radio signal received by the antennas 201 into a baseband signal (a received signal), and outputs the baseband signal to the processor 240.

The network interface 220 is connected to the neighboring eNB 200 via the X2 interface and is connected to the MME/S-GW 300 via the S1 interface. The network interface 220 is used in communication over the X2 interface and communication over the S1 interface.

The memory 230 stores a program to be executed by the processor 240 and information to be used for a process by the processor 240. The processor 240 includes a baseband processor that performs modulation and demodulation, encoding and decoding and the like on the baseband signal and CPU that performs various processes by executing the program stored in the memory 230. The processor 240 executes various processes and various communication protocols described later.

Figure 4:
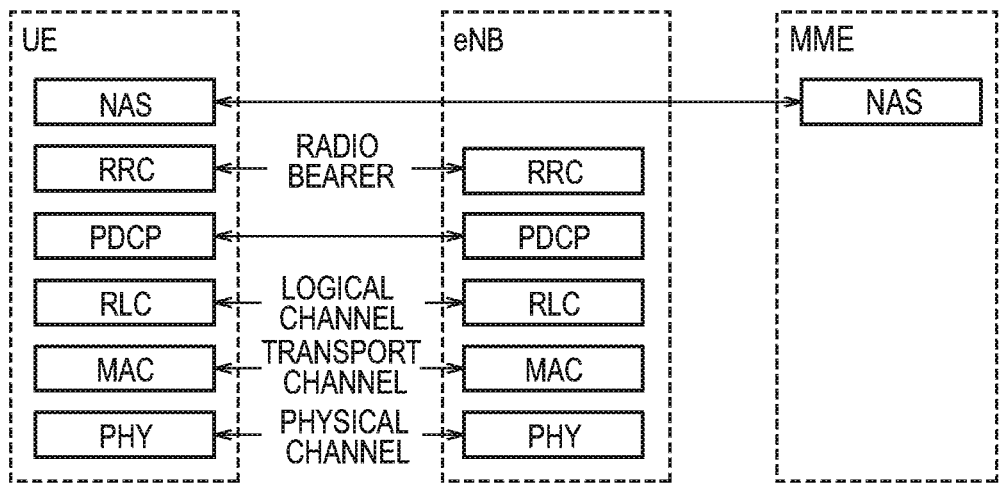
FIG. 4 is a protocol stack diagram of a radio interface according to the embodiment.

FIG. 4 is a protocol stack diagram of a radio interface in the LTE system. As illustrated in FIG. 4, the radio interface protocol is classified into a layer 1 to a layer 3 of an OSI reference model, wherein the layer 1 is a physical (PHY) layer. The layer 2 includes a MAC (Medium Access Control) layer, an RLC (Radio Link Control) layer, and a PDCP (Packet Data Convergence Protocol) layer. The layer 3 includes an RRC (Radio Resource Control) layer.

The PHY layer performs encoding and decoding, modulation and demodulation, antenna mapping and demapping, and resource mapping and demapping. Between the PHY layer of the UE 100 and the PHY layer of the eNB 200, use data and control signal are transmitted via the physical channel.

The MAC layer performs priority control of data, a retransmission process by hybrid ARQ (HARQ), a random access procedure at the time of RRC connection establishment, and the like. Between the MAC layer of the UE 100 and the MAC layer of the eNB 200, user data and control signal are transmitted via a transport channel. The MAC layer of the eNB 200 includes a scheduler that determines a transport format of an uplink and a downlink (a transport block size and a modulation and coding scheme (MCS)) and a resource block to be assigned to the UE 100.

The RLC layer transmits data to an RLC layer of a reception side by using the functions of the MAC layer and the PHY layer. Between the RLC layer of the UE 100 and the RLC layer of the eNB 200, user data and control signal are transmitted via a logical channel.

The PDCP layer performs header compression and decompression, and encryption and decryption.

The RRC layer is defined only in a control plane dealing with control signal. Between the RRC layer of the UE 100 and the RRC layer of the eNB 200, control message (RRC messages) for various types of configuration are transmitted. The RRC layer controls the logical channel, the transport channel, and the physical channel in response to establishment, re-establishment, and release of a radio bearer. When there is an RRC connection between the RRC of the UE 100 and the RRC of the eNB 200, the UE 100 is in an RRC connected state, otherwise the UE 100 is in an RRC idle state.

A NAS (Non-Access Stratum) layer positioned above the RRC layer performs a session management, a mobility management and the like.

Figure 5:
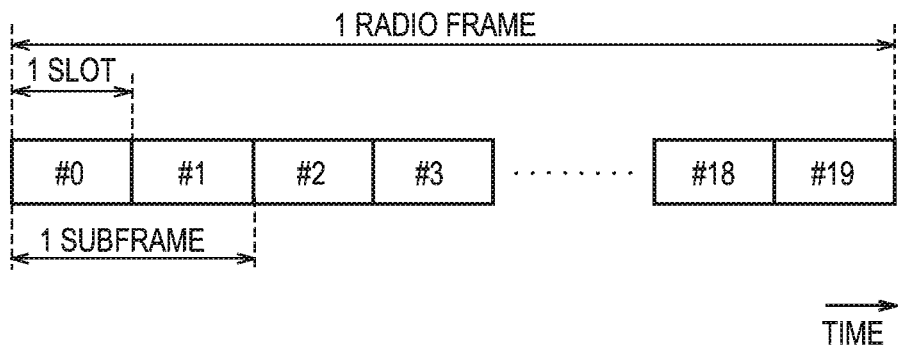
FIG. 5 is a configuration diagram of a radio frame according to the embodiment.

FIG. 5 is a configuration diagram of a radio frame used in the LTE system. In the LTE system, OFDMA (Orthogonal Frequency Division Multiple Access) is applied to a downlink (DL), and SC-FDMA (Single Carrier Frequency Division Multiple Access) is applied to an uplink (UL), respectively.

As illustrated in FIG. 5, the radio frame is configured by 10 subframes arranged in a time direction, wherein each subframe is configured by two slots arranged in the time direction. Each subframe has a length of 1 ms and each slot has a length of 0.5 ms. Each subframe includes a plurality of resource blocks (RBs) in a frequency direction, and a plurality of symbols in the time direction. The resource block includes a plurality of subcarriers in the frequency direction. Resource element is configured by one subcarrier and one symbol. Among radio resources assigned to the UE 100, a frequency resource can be configured by a resource block and a time resource can be configured by a subframe (or slot).

(Application Scenario)

An application scenario of an LTE system according to an embodiment will be described below. In the embodiment, a specific frequency band is used in LTE communication (mobile communication). The specific frequency band is a frequency band that is shared by a plurality of mobile network operators or a plurality of communication systems.

In other words, the specific frequency band is a frequency band that cannot be occupied by one mobile network operator.

Among specific frequency bands, a licensed shared band is a frequency band that is allocated for primary users of a frequency; however, depending on geographical conditions or technical conditions, a licensed shared band is a frequency that can also be used by secondary users.

When a case is assumed in which a specific frequency band is a licensed shared band, for example, in a specific frequency band, users of a television broadcast correspond to primary users, and users of LTE communication correspond to secondary users. The primary users use the specific frequency band for a purpose (objective) for which a license has been granted. That is, the primary users are assumed to be given priority over the second users for the use of the specific frequency band.

In this way, a specific frequency band is a frequency band that does not allow the primary use of a frequency by an LTE network operator (hereinafter, called an "operator"), and that cannot be occupied by one operator.

Figure 6:
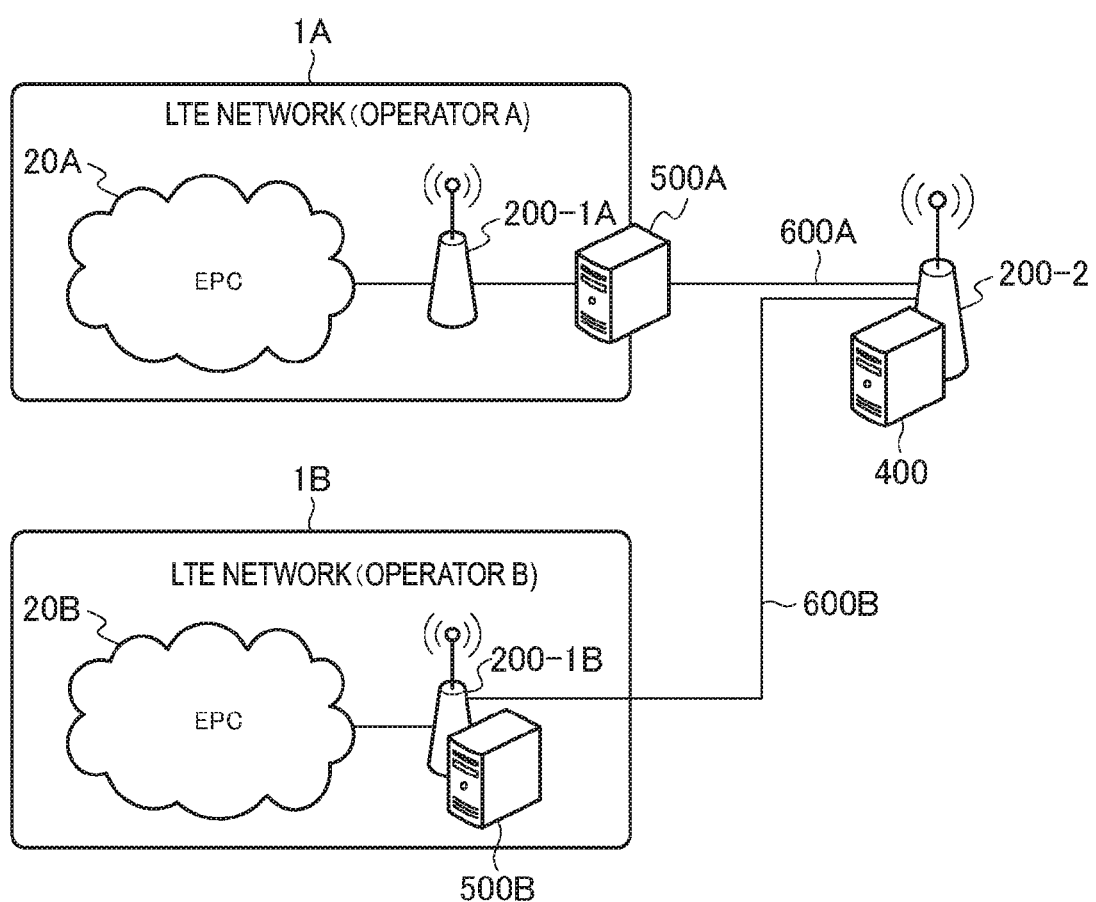
FIG. 6 is a diagram showing an application scenario of an LTE system according to the embodiment.

FIG. 6 is a diagram showing an application scenario of an LTE system according to the embodiment.

As shown in FIG. 6, the LTE system according to the embodiment includes an LTE network 1A of an operator A, an LTE network 1B of an operator B, and an eNB 200-2. The LTE network 1A includes an eNB 200-1A and an EPC 20A. The LTE network 1B includes an eNB 200-1B and an EPC 20B. In the embodiment, the eNBs 200-1 (200-1A and 200-1B) correspond to a general base station.

The eNB 200-2 is an eNB 200 that is shared by a plurality of operators (the operators A and B), and that performs LTE communication with a UE 100 in a specific frequency band. In the embodiment, the eNB 200-2 corresponds to a specific base station. The eNB 200-2 is, for example, operated by a company or an organization that is independent of the operator A and the operator B (a so-called third party), or a collaborative company of the operator A and the operator B (a so-called joint venture). In the embodiment, a case in which a cell of the eNB 200-2 is adjacent to a cell of the eNB 200-1 is assumed.

The eNB 200-2 performs backhaul communication with the eNB 200-1A that is set up in the LTE network 1A of the operator A, via an inter-eNB interface 600A between eNBs. The eNB 200-2 performs backhaul communication with the eNB 200-1B that is set up in the LTE network 1B of the operator B, via an inter-eNB interface 600B. The inter-eNB interface 600 (600A and 600B) between eNBs is an X2 interface, for example.

Further, the LTE system according to the embodiment includes an interface controller 400 provided external to the LTE network 1 (1A and 1B). The interface controller 400 establishes a communication path between the interface controller 400 and the LTE network 1, which is used as the inter-eNB interface 600. The communication path, for example, is a VPN (a Virtual Private Network). In the embodiment, the interface controller 400 is provided internal to the eNB 200-2. However, the interface controller 400 may be provided external to the eNB 200-2, and may be connected to the eNB 200-2.

The LTE network 1 has a gateway 500 that functions as a connection point between the eNB 200-2 and the LTE network 1. In FIG. 6, a case in which the gateway 500A of the LTE network 1A is provided external to the eNB 200-1A, and the gateway 500B of the LTE network 1B is provided internal to the eNB 200-1B is illustrated.

In such an application scenario, the eNB 200-2 individually performs LTE communication with one UE 100 (single eNB communication).

Alternatively, the eNB 200-2 performs LTE communication with one UE 100 in cooperation with the eNB 200-1 (multiple eNBs communication) while using the inter-eNB interface 600. In this case, the one UE 100 receives an allocation of a radio resource from both the eNB 200-1 and the eNB 200-2. Such a multiple eNBs communication is called a dual connectivity. The details of the dual connectivity will be described later.

It is noted that a scheduling method by which a plurality of operators (the operators A and B) share the eNB 200-2 (a specific frequency band) includes, for example, the following two methods.

The first scheduling method is a method in which a plurality of operators uses the eNB 200-2 based on time division. For example, one subframe is allocated to one operator. According to the first scheduling method, the eNB 200-2 notifies the subframe information and/or the frequency resource information that an operator can use per unit time, to the LTE network 1 (eNB 200-1) of the operator.

The second scheduling method is a method by which a different frequency resource is allocated to each operator while enabling a plurality of operators to simultaneously use the eNB 200-2. That is, frequency division of a specific frequency band is performed among a plurality of operators. In this case, a MAC scheduler that is shared by a plurality of operators (an integrated MAC scheduler) is provided in the eNB 200-2. According to the second scheduling method, the eNB 200-2 notifies the frequency resource information that an operator can use per unit time, to the LTE network 1 (eNB 200-1) of the operator.

In this way, in the application scenario according to the embodiment, a plurality of operators can use a specific frequency band in LTE communication while sharing a specific frequency band. Thus, an effective use of the specific frequency band can be achieved.

(Dormant Mode)

A dormant mode according to the embodiment will be described below. In the embodiment, when the eNB 200-2 cannot use a specific frequency band in LTE communication, the eNB 200-2 transitions to a dormant mode in which at least the LTE communication is suspended, and also suspends backhaul communication in the dormant mode. The backhaul traffic load can thus be reduced by such a backhaul dormant.

Here, the case in which a specific frequency band cannot be used for LTE communication implies a case in which a primary user of the specific frequency band is detected in the vicinity of the eNB 200-2, for example. The eNB 200-1 detects the primary user based on a measurement report from the UE 100 connected to the eNB 200-1, and notifies the same from the eNB 200-1 to the eNB 200-2. Alternatively, a period during which LTE communication is not performed is set in the eNB 200-2, and the eNB 200-2 detects the primary user by performing carrier sense during the period.

Figure 7:
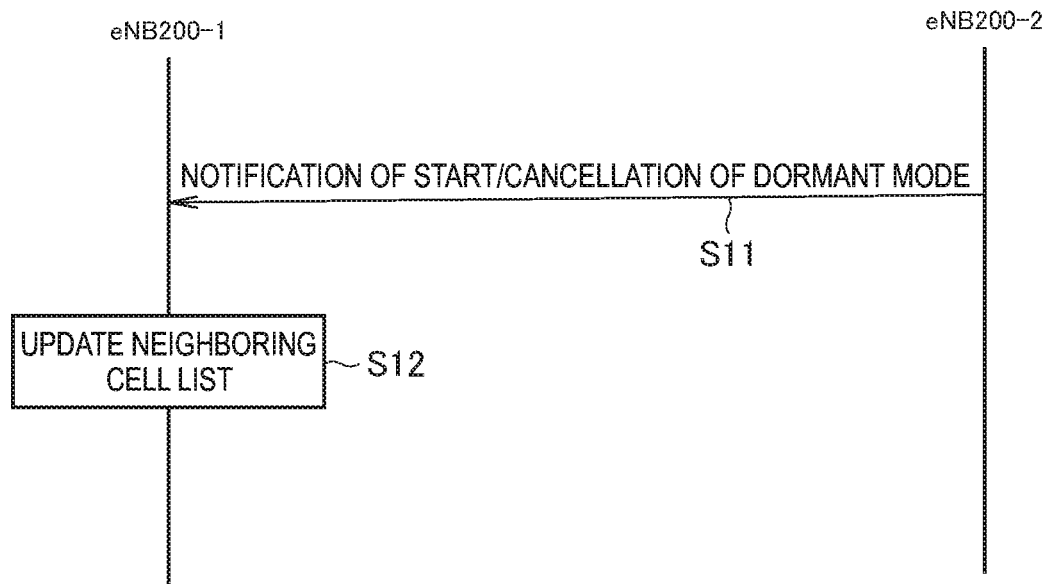
FIG. 7 is a diagram showing an operation related to a dormant mode according to the embodiment.

FIG. 7 is a diagram showing an operation related to the dormant mode.

As shown in FIG. 7, the eNB 200-2 (or the interface controller 400) transmits, to the eNB 200-1, a start notification indicating the start of the dormant mode, or a cancellation notification indicating the cancellation of the dormant mode, via the inter-eNB interface 600 (step S11). As a result, the eNB 200-1 can understand start and cancellation of the dormant mode in the eNB 200-2. The dormant mode cancellation notification may include frequency information indicating the frequency band to be used in LTE communication after the cancellation of the dormant mode.

In the embodiment, the eNB 200-1 manages a neighboring cell list (neighbor list) that includes the cell information of the eNB 200-2, and mode information regarding whether or not the eNB 200-2 is in the dormant mode. The eNB 200-1 updates the mode information included in the neighboring cell list in response to the reception of the dormant mode start notification or cancellation notification (step S12). As a result, the eNB 200-1 can appropriately manage the mode of the eNB 200-2.

(Dual Connectivity)

The LTE system according to the embodiment supports a dual connectivity. The dual connectivity is expected to be introduced in Release 12 and thereafter. In the dual connectivity, a radio resource is allocated to the UE 100 from a plurality of eNBs 200, and thus, an improvement in throughput is expected. It is noted that the dual connectivity may be called a carrier aggregation between eNBs (inter-eNB CA).

Figure 8:
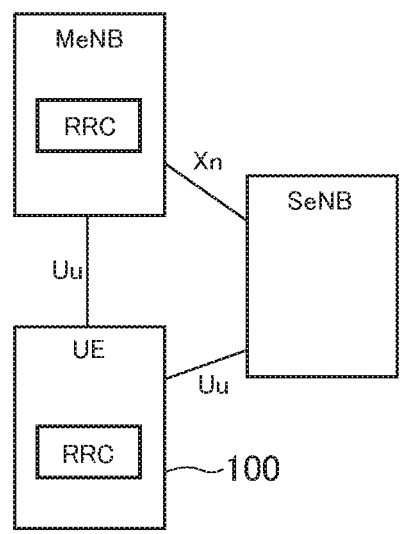
FIG. 8 is a diagram showing an overview of a dual connectivity according to the embodiment.

FIG. 8 is a diagram showing an overview of the dual connectivity.

As shown in FIG. 8, in the dual connectivity, of the plurality of eNBs 200 that establish a connection with the UE 100, only a master eNB (MeNB) establishes an RRC connection with the UE 100. On the other hand, of the plurality of eNBs 200, a secondary eNB (SeNB) provides an additional radio resource to the UE 100 without establishing an RRC connection with the UE 100. An Xn interface is set between the MeNB and the SeNB. The Xn interface is an X2 interface or a new interface.

In the dual connectivity, the UE 100 is capable of carrier aggregation using N number of cells managed by the MeNB and M number of cells managed by the SeNB, simultaneously. Here, a group composed of N number of cells managed by the MeNB is called a master cell group (MCG). Moreover, a group composed of M number of cells managed by the SeNB is called a secondary cell group (SCG).

In the embodiment, it is prohibited to set the eNB 200-2 as an MeNB. In contrast, it is allowed to set the eNB 200-2 as an SeNB. That is, a dual connectivity in which the eNB 200-1 is set as the MeNB, and the eNB 200-2 is set as the SeNB is assumed. Further, the inter-eNB interface 600 is used as an Xn interface. A UE 100 in an RRC connected state simultaneously performs communication with the eNB 200-1 (MeNB) and with the eNB 200-2 (SeNB) through the dual connectivity.

As a result, an appropriate dual connectivity can be realized by setting the eNB 200-1 that has a high reliability of LTE communication as the MeNB rather than setting the eNB 200-2 that has a low reliability of LTE communication as the MeNB.

For example, when the UE 100 that establishes an RRC connection with the eNB 200-1 supports the dual connectivity described above, the UE 100 notifies, to the eNB 200-1, capability information indicating that the UE 100 itself supports the dual connectivity described above. Specifically, in a dual connectivity based on a combination of the eNB 200-1 and the eNB 200-2, the UE 100 must include a first radio transceiver 110 compatible with the frequency band of the LTE network 1, and a second radio transceiver 110 compatible with a specific frequency band. Thus, the UE 100 may notify, to the eNB 200-1, capability information indicating that the UE 100 includes two such radio transceivers. Alternatively, when the UE 100 supports the LTE communication using a specific frequency band, the UE 100 may notify, to the eNB 200-1, the capability information concerning the specific frequency band.

The eNB 200-1 that receives the capability information from the UE 100 determines whether or not to start communication of a dual connectivity in which the eNB 200-2 is set as an SeNB, with the UE 100, on the basis of the received capability information. The eNB 200-1 that has determined to start the communication of a dual connectivity, transmits, to the eNB 200-2, an SeNB addition request. In response to the reception of the SeNB addition request from the eNB 200-1, the eNB 200-2 sets the radio resource for the UE 100, and transmits an SeNB addition response to the eNB 200-1. As a result, the communication of a dual connectivity is started.

Further, when a UE 100 that supports the dual connectivity starts the dual connectivity after establishing an RRC connection with the eNB 200-2, the problem described below occurs. Specifically, since it is prohibited to set the eNB 200-2 as an MeNB, a handover procedure for shifting the RRC connection from the eNB 200-2 to the eNB 200-1 becomes necessary, which complicates the process for starting the dual connectivity.

Thus, in the embodiment, in the RRC idle state, the UE 100 that supports the dual connectivity performs a cell re-selection control for selecting a cell of the eNB 200-1 as a serving cell (camping destination cell) rather than selecting a cell of the eNB 200-2 as the serving cell. For example, presettings for the UE 100 that supports the dual connectivity may set so that the specific frequency band may be excluded from an evaluation target of cell re-selection.

As a result, it is possible to prohibit the UE 100 that supports the dual connectivity from selecting a cell of the eNB 200-2 as the serving cell, in the RRC idle state. That is, the UE 100 that supports the dual connectivity always selects a cell of the eNB 200-1 as the serving cell, in the RRC idle state. Thus, an RRC connection is always established with the eNB 200-1 when transitioning to the RRC connected state, and as a result, it is possible to start communication of a dual connectivity smoothly.

Other Embodiments

In the above-described embodiment, a case in which the UE 100 notifies capability information to the eNB 200-1 is illustrated, however, the UE 100 may notify the capability information to the eNB 200-2.

In the above-described embodiment, a case in which the specific frequency band is a licensed shared band is mainly assumed. However, the specific frequency band may be an ISM (Industry-Science-Medical) band, such as the 2.4-GHz band; that is, the specific frequency band may be an unlicensed band.

Furthermore, in the embodiment described above, although an LTE system is described as an example of a mobile communication system, the present invention is not limited to the LTE system, and may be applied to a system other than the LTE system.

The entire content of Japanese Patent Application No. 2014-032298 (filed on Feb. 21, 2014) is incorporated in the present specification by reference.

INDUSTRIAL APPLICABILITY

The present invention is useful in the field of radio communication.

The invention claimed is:

1. A mobile communication system, comprising:
    a specific cellular base station that is a base station that performs mobile communication with a user terminal in an unlicensed frequency band, wherein
    the specific cellular base station is configured to perform communication with a general cellular base station via an inter-base station interface,
    a predetermined user terminal that supports a dual connectivity in which communication with the general cellular base station and communication with the specific cellular base station are performed simultaneously, wherein
    the general cellular base station is a master base station that establishes an RRC connection with the user terminal in the dual connectivity,
    the specific cellular base station is a secondary base station that provides additional radio resources to the user terminal in the dual connectivity, and
    the predetermined user terminal notifies capability information indicating that the predetermined user terminal supports the dual connectivity, to the general cellular base station or the specific cellular base station.

2. The mobile communication system according to claim 1, wherein
    the predetermined user terminal that is in an RRC idle state performs cell re-selection control for selecting a cell of the general cellular base station as a serving cell rather than selecting a cell of the specific cellular base station as the serving cell.

3. The mobile communication system according to claim 1, wherein
    the predetermined user terminal notifies the capability information to the general cellular base station,
    the capability information further indicates whether the user terminal is capable of performing communication via the unlicensed frequency band, and
    the general cellular base station determines, based upon the received capability information, whether to start a communication of the dual connectivity with the predetermined user terminal in which the specific cellular base station is set as the secondary base station.

4. The mobile communication system according to claim 1, wherein
    the specific base station provides at least one radio resource to the predetermined user terminal without establishing an RRC connection with predetermined user terminal.

5. A user terminal, comprising:
    a controller configured to perform communication with a general cellular base station and a specific cellular base station by dual connectivity in which communication with the general cellular base station and communication with the specific cellular base station are performed simultaneously, the specific cellular base station performing communication with the user terminal in an unlicensed frequency band, the general cellular base station performing communication with the specific cellular base station via an inter base station interface, wherein
    in the dual connectivity, the general cellular base station is set as a master base station that establishes an RRC connection with the user terminal, and the specific cellular base station is set as a secondary base station that provides additional radio resources to the user terminal, and
    the controller is further configured to notify capability information indicating that the predetermined user terminal supports the dual connectivity, to the general cellular base station or the specific cellular base station.

6. The user terminal according to claim 5, wherein
    when the user terminal is in an RRC idle state, the controller performs cell re-selection control for selecting a cell of the general cellular base station as a serving cell rather than selecting a cell of the specific cellular base station as the serving cell.

* * * * *